United States Patent [19]

Raasch et al.

[11] Patent Number: 5,333,273
[45] Date of Patent: Jul. 26, 1994

[54] PROTECTED HOT KEY FUNCTION FOR MICROPROCESSOR-BASED COMPUTER SYSTEM

[75] Inventors: Charles F. Raasch, El Toro; Michael K. Goodman, Tustin, both of Calif.

[73] Assignee: AST Research, Inc., Irvine, Calif.

[21] Appl. No.: 939,583

[22] Filed: Sep. 3, 1992

Related U.S. Application Data

[63] Continuation of Ser. No. 611,292, Nov. 9, 1990.

[51] Int. Cl.⁵ .................................................. G06F 13/24
[52] U.S. Cl. ................................. 395/275; 364/709.09
[58] Field of Search ................. 395/275; 364/709.09, 364/709.12

[56] References Cited

U.S. PATENT DOCUMENTS

| | | | |
|---|---|---|---|
| 4,200,913 | 4/1980 | Kuhar et al. | 364/900 |
| 4,319,326 | 3/1982 | Uchida | 364/900 |
| 4,355,941 | 6/1982 | Moyroud et al. | 354/15 |
| 4,424,576 | 1/1984 | Lang et al. | 364/900 |
| 4,460,957 | 7/1984 | Eggebrecht et al. | 364/200 |
| 4,484,826 | 11/1984 | Horn et al. | 364/900 |
| 4,695,945 | 9/1987 | Irwin | 364/200 |
| 4,710,869 | 12/1987 | Enokizono | 314/709.9 |
| 4,749,354 | 6/1988 | Kerman | 434/321 |
| 4,768,149 | 8/1988 | Konopik | 364/200 |
| 5,038,279 | 8/1991 | Bertram | 364/200 |
| 5,056,057 | 10/1991 | Johnson et al. | 364/900 |
| 5,058,001 | 10/1991 | Cox et al. | 364/200 |

OTHER PUBLICATIONS

*WD76C10, WD76C10LP System Controller for 80386SX,* *80286 Desktop and Portable Compatible,* Western Digital Corporation, 1990.
*WD76C30 Peripheral Controller/Interrupt Multiplexer/Clock Generator,* Western Digital Corporation, 1990.

*Primary Examiner*—Dale M. Shaw
*Assistant Examiner*—C. Shin
*Attorney, Agent, or Firm*—Knobbe, Martens, Olson & Bear

[57] ABSTRACT

An ISA-compatible computer system includes an additional function key on its keyboard. The additional function key does not have a defined function for conventional ISA-standard computers. When a conventional alphanumeric key or function key is activated on the keyboard, the computer system is interrupted using IRQ1 and the key information is communicated to the computer system so that the computer system can respond in a conventional manner using a conventional keyboard interrupt handling routine. When the additional function key and an alphanumeric key are activated in combination, a second interrupt different from the IRQ1 interrupt is activated (e.g., IRQ15). The computer system responds to the second interrupt by inputting an identification of the activated alphanumeric key and performing a selected predetermined function in response thereto. The handling of the second interrupt is performed by a separate interrupt handling routine within the computer system so that conventional terminate and stay resident (TSR) programs that intercept conventional keyboard inputs cannot readily intercept keyboard input initiated by the additional function key.

7 Claims, 11 Drawing Sheets

PROTECTED HOT KEY FUNCTION FOR MICROPROCESSOR-BASED COMPUTER SYSTEM

This application is a continuation of application Ser. No. 07/611,292, filed Nov. 9, 1990.

BACKGROUND OF THE INVENTION

1. Field of the Invention

The present invention is in the field of microprocessor-based computer systems, and, more particularly, is in the field of computer systems based upon the Industry Standard Architecture (ISA) utilizing the Intel 80x86 microprocessors and equivalents.

2. Description of the Related Art

The Industry Standard Architecture (ISA) was developed by IBM Corporation for use in its AT-type computers and defines an architectural environment for computers that utilize an Intel 80x86 microprocessor, such as the Intel 80286, the Intel 80386, the Intel 80386SX, and the like. A large number of computer systems have been developed that are ISA compatible, and an extensive quantity of software has been written to operate on ISA-compatible computer systems. Such software includes applications programs such as spreadsheets, computer automated drafting programs, word processing programs, games, and the like; software development programs, such as assemblers, compilers for higher level languages, and the like; and network and communications programs.

Another category of programs that have been developed to enhance the user-friendliness of ISA-compatible computer systems are the so-called terminate and stay resident (TSR) programs. These programs are loaded into a computer system prior to loading and running an application program and provide a number of useful functions that can be utilized while the computer system is running the application program. Generally, the TSR program runs in the background and does not interfere with the normal operation of the application program. An exemplary TSR program may include a number of so-called "hot keys" which enable the TSR program to be temporarily brought to the foreground so that the user can interact with the TSR program. For example, the user can activate a particular key combination, such as the Control (Ctrl) key and one of the alphanumeric keys to call up a TSR calendar program and review appointments, and the like. Different hot key combinations can call up different functions provided by the TSR program such as a memo function to save data to be utilized in another applications program. Other TSR programs may include keyboard enhancements (e.g., to control the cursor speed), video enhancements, and so on.

One of the potential problems with the utilization of hot keys to control TSR programs is that the hot keys of one TSR program may interfere with the hot keys of another TSR program such that loading of the second TSR program effectively disables the first TSR program. A worst case can occur when a hot key combination of a TSR program conflicts with an operational key combination of an applications program so that the TSR program is activated when the user actually wanted to perform one of the functions of the applications program. Although many TSR programs provide the ability to assign different hot key functions to attempt to avoid such conflicts, it is not always possible to avoid all such conflicts, particularly if the user runs a number of different applications programs and TSR programs. Furthermore, many computer users are not sufficiently sophisticated that they can anticipate the conflicts between the TSR programs and the applications programs so that they can make the appropriate hot key assignments. Thus, a need exists for hot key functions than cannot conflict with other users.

SUMMARY OF THE INVENTION

The present invention is an improved system for implementing a plurality of hot keys for performing functions independently of an applications program. The system includes an independent function key on the keyboard that is not provided on a conventional ISA-type computer system. When the independent function key is activated along with one of the conventional keys on the keyboard, an interrupt is generated to the computer system to activate an interrupt handling routine in place of the current applications program. The interrupt handling routine determines which of the conventional keys was activated to determine which function the user has requested and then activates that function. When the requested function is concluded, the applications program resumes operation. The interrupt handling routine is entirely independent of the conventional keyboard interrupt handling routine utilized by typical TSR programs and thus the use of such TSR programs will not interfere with or supplant the functions provided by the present invention. Further, the present invention will not interfere with the operation of any conventional applications program designed for operation on a conventional ISA-compatible computer systems since the independent function key is not available on such systems. Thus, a manufacturer can provide the independent function key and provide hot key functions that operate in response to the independent function key that can operate without any interference from or without interfering with an applications program or a TSR program.

One aspect of the present invention is a system for providing a built-in function in an ISA-compatible computer in response to the activation of a selected combination of user activated keys. The invention comprises a keyboard having a set of conventional alphanumeric and function keys and further having at least one additional function key. A keyboard controller is connected to the keyboard to monitor the activation of the conventional keys and the additional function key. The keyboard controller is responsive to the activation of the conventional keys to activate a first interrupt to the ISA-compatible computer. The keyboard controller is responsive to the activation of the additional function key in combination with at least one of the conventional alphanumeric keys to generate a second interrupt to the ISA-compatible computer. The ISA-compatible computer system includes a first conventional interrupt handling routine that is responsive to the first interrupt from the keyboard controller to input data scan codes from the keyboard, and includes a second non-conventional interrupt handling routine that is responsive to the second interrupt from the keyboard controller to input an identification of the activated alphanumeric key and to perform a predetermined function selected by the identified alphanumeric key.

DETAILED DESCRIPTION OF THE PREFERRED EMBODIMENT

Figure 1:
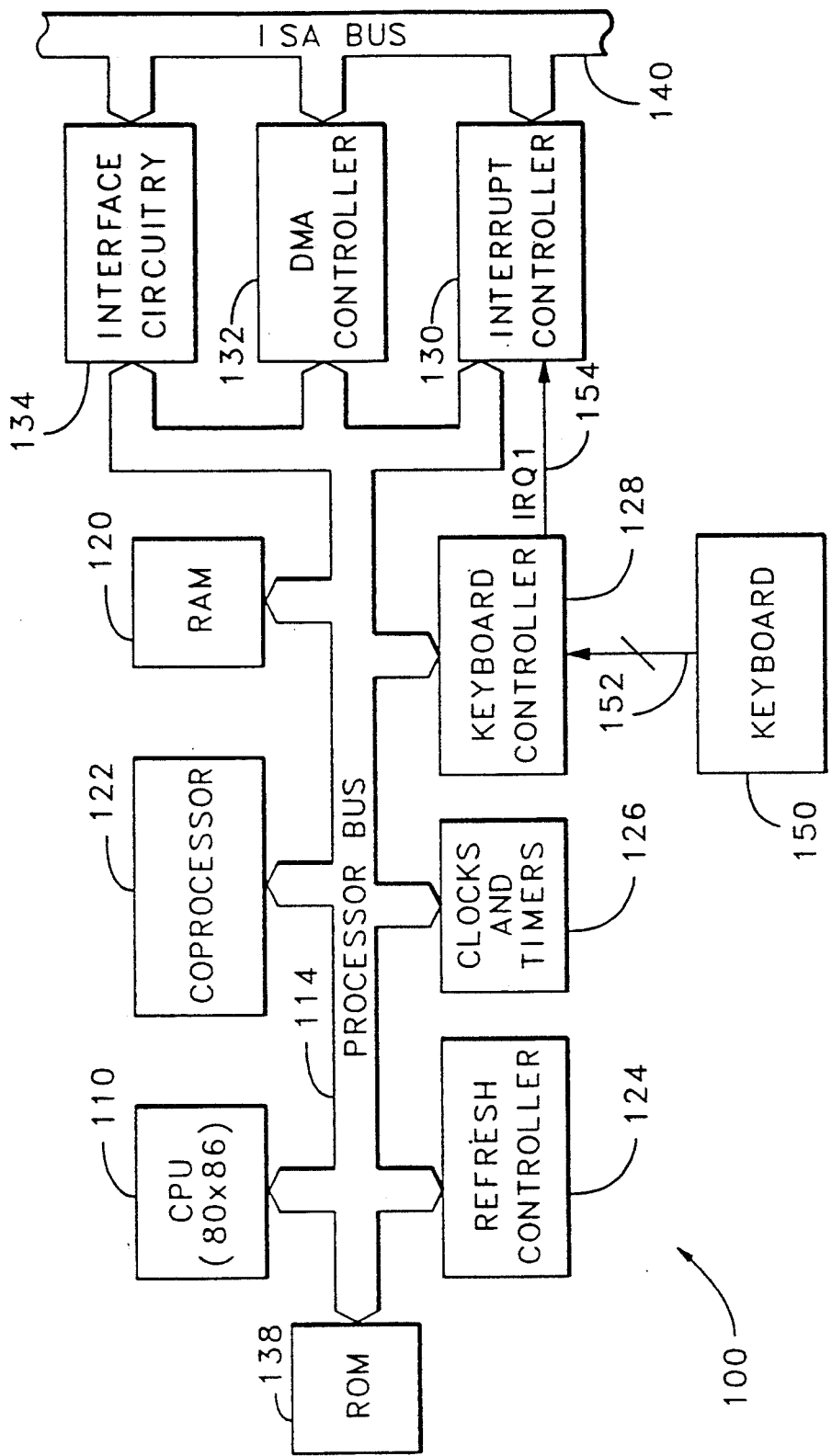
FIG. 1 illustrates a block diagram of a portion of an exemplary conventional ISA-compatible computer system 100 showing the principal components of the system.

FIG. 1 illustrates a block diagram of a portion of an exemplary conventional ISA-compatible computer system 100 showing the principal components of the system. The architecture of ISA-compatible computer systems is well known and will not be described in detail herein. The system 100 includes a microprocessor or central processing unit (CPU) 110 which is preferably an Intel ® 80x86 microprocessor, such as the 80286, the 80386, the 80386SX, or the like. The embodiments will be described herein with respect to the Intel 80386SX microprocessor.

The microprocessor 110 communicates with other components of the system 100 via a local processor bus 114. For example, the illustrated system includes a random access read/write memory (RAM) 120, a math coprocessor 122, a memory refresh controller 124, clock and timer circuits 126, a keyboard controller 128, an interrupt controller 130, a DMA controller 132, interface circuitry 134 and a read only memory (ROM) 138 which communicate with the microprocessor 114 via the processor bus 114. The interrupt controller 130, the DMA controller 132 and the interface circuitry 134 provide communications between the processor bus 114 and an ISA bus 140. (As discussed above, the ISA (Industry Standard Architecture) bus is often referred to as the AT-bus.) The ISA bus 114 includes a plurality of address, data and control lines that provide communications to and from peripheral device controller that are connected to the ISA bus 114.

The keyboard controller 128 is connected to a keyboard 150 via a plurality of signal lines 152. (Multiple signal lines are shown herein as a single line with an oblique slash across it.) As further illustrated in FIG. 1, the keyboard controller 128 is interconnected with the interrupt controller 130 via at least one signal line 154. The keyboard 150 operates in a known conventional manner to repeatedly scan a plurality of contact switches associated with the keys on the keyboard to determine if one or more contact switches is open or closed. When an open contact switch is closed by depressing a key or a closed contact switch is opened by releasing a key, the keyboard 150 generates a scan code which is communicated to the keyboard controller 128 via the signal lines 152. In the ISA compatible computer systems, a different scan code is generated when a contact switch is closed than when the contact switch is open.

Figure 2:
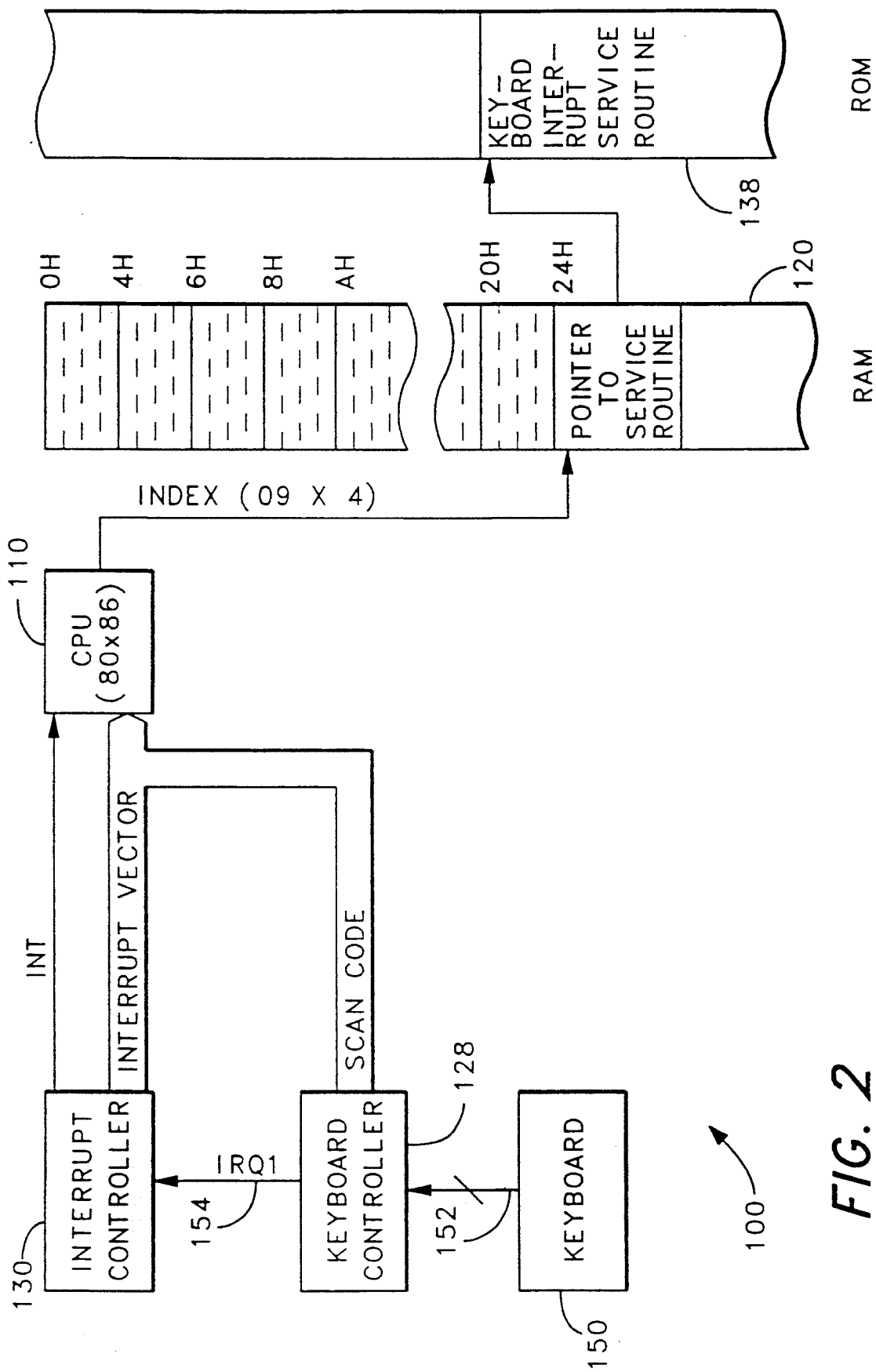
FIG. 2 is a partial block diagram and pictorial illustration of the communication of keyboard scan code information from the keyboard controller.

The communication of keyboard scan code information from the keyboard controller 128 to the microprocessor 110 is illustrated pictorially in FIG. 2. The keyboard controller 128 stores the scan codes received from the keyboard 150 and generates an interrupt signal to the interrupt controller 130 via the signal line 154. The interrupt controller 130 has a plurality of interrupt request lines IRQ0 through IRQ15 that can be connected to devices that communicate with the microprocessor 110 on an interrupt basis. In the ISA-compatible computers, the interrupt signal from the keyboard controller 128 is communicated to the interrupt controller 130 via the IRQ1 signal line which has the second highest priority. The interrupt controller 130 receives the IRQ1 interrupt signal along with interrupt signals from other devices, such as peripheral device controllers on the ISA bus 140, and generates an interrupt to the microprocessor 110 via dedicated signal lines that form part of the processor bus 114. When the microprocessor 110 acknowledges the interrupt generated by the interrupt controller 130 and enables the interrupt controller 130, the interrupt controller 130 generates an interrupt vector that is communicated to the microprocessor 110 via data lines within the processor bus 114. The interrupt vector generated by the interrupt controller 130 encodes the source of the interrupt to the interrupting device currently having the highest priority. The interrupt controller 130 is programmable and is initialized with a vector for each of the interrupt inputs. In the ISA compatible computers, the highest priority interrupt corresponding to IRQ0 is assigned an interrupt vector value of 08H (referred to as INT 08H), and the keyboard interrupt is assigned the interrupt vector value of 09H (INT 09H). The "H" following a number is used to indicate a hexadecimal number in a conventional manner. The interrupt requests IRQ2 through IRQ7 are assigned the interrupt vector values of 0AH (INT 0AH) through 0FH (INT 0FH), and the interrupt requests IRQ8 through IRQ15 are assigned the interrupt vector values of 70H through 77H (INT 70H through INT 77H). Thus, when the interrupt from the keyboard controller 128 has the highest priority, the interrupt controller 130 transmits an interrupt vector having a value of 09H to the microprocessor 110.

The microprocessor 110 utilizes the interrupt vector received from the interrupt controller 130 as an index to an interrupt vector table that begins at location OH in its RAM 120. (Although the 80386SX microprocessor utilizes segment and offset addresses in the format xxxx:yyyy, the addresses will be discussed herein as absolute addresses in bytes from the lowest address in memory.) In ISA compatible computer systems, the interrupt vector table includes four bytes of data for each interrupt vector. For example, the interrupt vector for the keyboard interrupt is located at address 24H and includes a four-byte pointer to the segment and offset of a memory location where the interrupt service routine for the keyboard is located. The keyboard interrupt service routine may be located in the RAM 120 or it may be located in the ROM 138. Generally, the keyboard interrupt service routine for the keyboard is provided as a basic operating function of the computer system 100 and is stored in the ROM 138 as part of the Basic Input/Output System (BIOS) of the computer system. As part of the keyboard interrupt service routine, the microprocessor 110 is caused to enable the keyboard controller 128 onto the processor bus 114 to communicate the keyboard scan codes from the keyboard controller to the microprocessor 110. The microprocessor 110 converts the scan code into an ASCII character that represents the alphanumeric key depressed by the user or performs a function determined by the depressed character (e.g., changing a subsequent character from lowercase to uppercase because the shift key is depressed).

Figure 3:
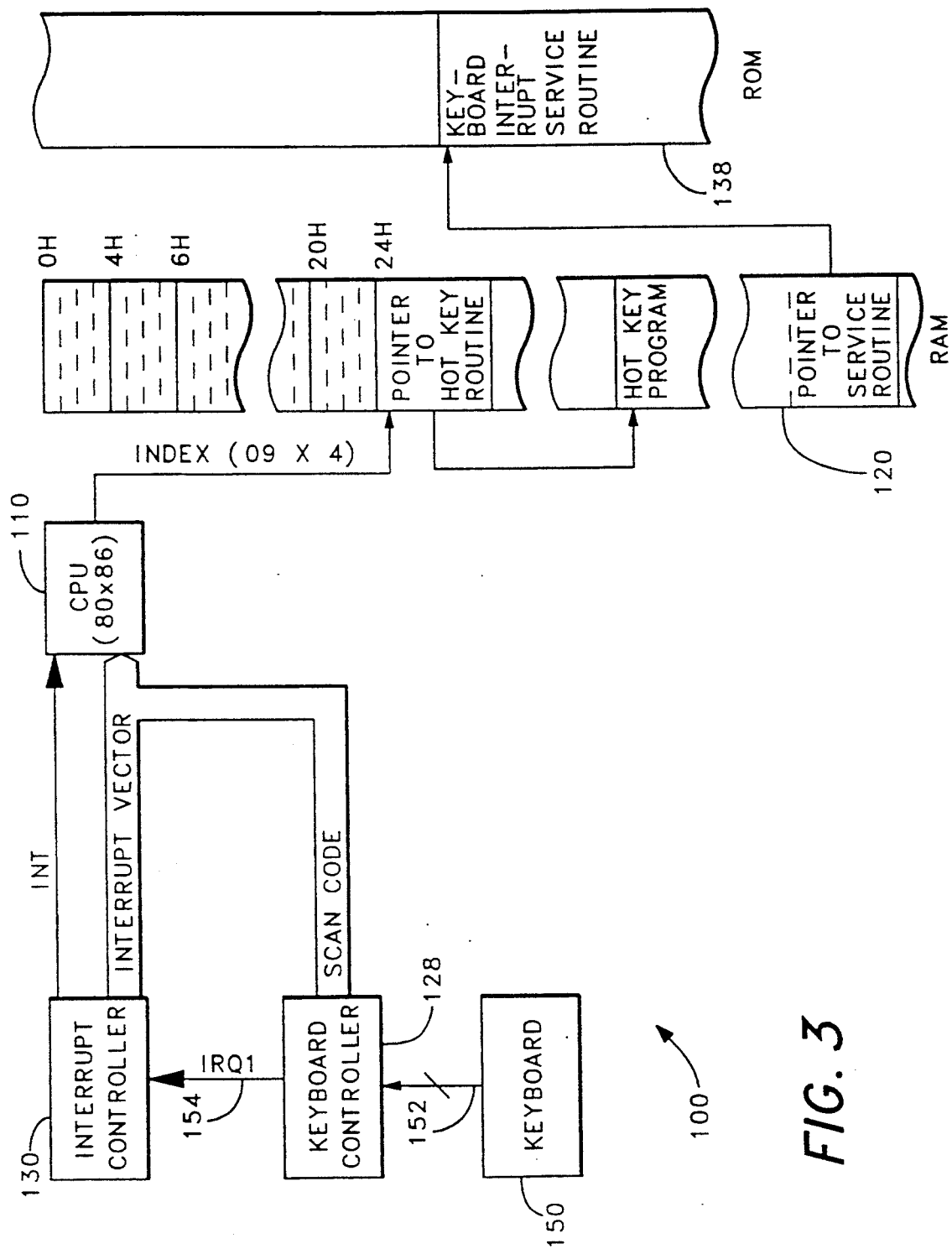
FIG. 3 is a partial block diagram and pictorial illustration similar to FIG. 2 showing the communication of keyboard scan code information from the keyboard controller and further showing the effect of a TSR program that intercepts the keyboard interrupt.

Referring now to FIG. 3, the operation of a conventional hot key program will be briefly explained. As set forth above, the pointer to the keyboard service is located at address 24H in the RAM 120. Generally, the pointer is stored in the RAM 120 as part of the initialization of the computer system 100 when first powered up or when reset. As set forth above, the pointer at the RAM address 24H is typically directed to a location in the ROM 138; however, since the pointer is in the RAM 120 and it can be changed after initialization. A TSR program that provides hot key functions takes advantage of the alterability of the pointer at the RAM address 24H. When the TSR program is initially run, it loads a program in the RAM 120 that performs the hot key functions in response to the activation of a hot key combination by the user. The program is labeled as "HOT KEY PROGRAM" in FIG. 3. After loading the hot key program, the pointer to the ROM BIOS keyboard interrupt service routine is replaced with a pointer to the hot key program. Thereafter, when the keyboard interrupt request signal (IRQ1) is activated, the modified pointer at the RAM address 24H causes the microprocessor 110 to execute the hot key program in the RAM 120. The first thing a typical hot key program does is to input the scan code data from the keyboard controller 128 and compare the scan code data to the hot key combinations. If a hot key combination occurs, the hot key program executes a series of instructions associated with the detected combination. If the scan code data is not associated with a hot key combination, the hot key program typically invokes the conventional keyboard interrupt handling routine in BIOS which operates on the scan code data in a conventional manner. Thus, as illustrated in FIG. 3, the hot key program stores the pointer originally located in RAM address 24H to provide a path to the ROM BIOS keyboard interrupt handling routine.

As discussed above, one of the problems with conventional hot key programs is that the hot key combinations may conflict with key combinations used by applications programs. The ability to replace the pointer at the RAM location 24H means that a first hot key program can be superseded by a second hot key program which replaces the pointer to the first hot key program with a pointer to the second hot key program. Thus, although the user may assume that the first hot key program is still fully operational, the second hot key program may partially disable the first hot key program. A conventional ISA compatible computer system does not include any means for precluding the first hot key program from being compromised by subsequent hot key programs.

Figure 4:
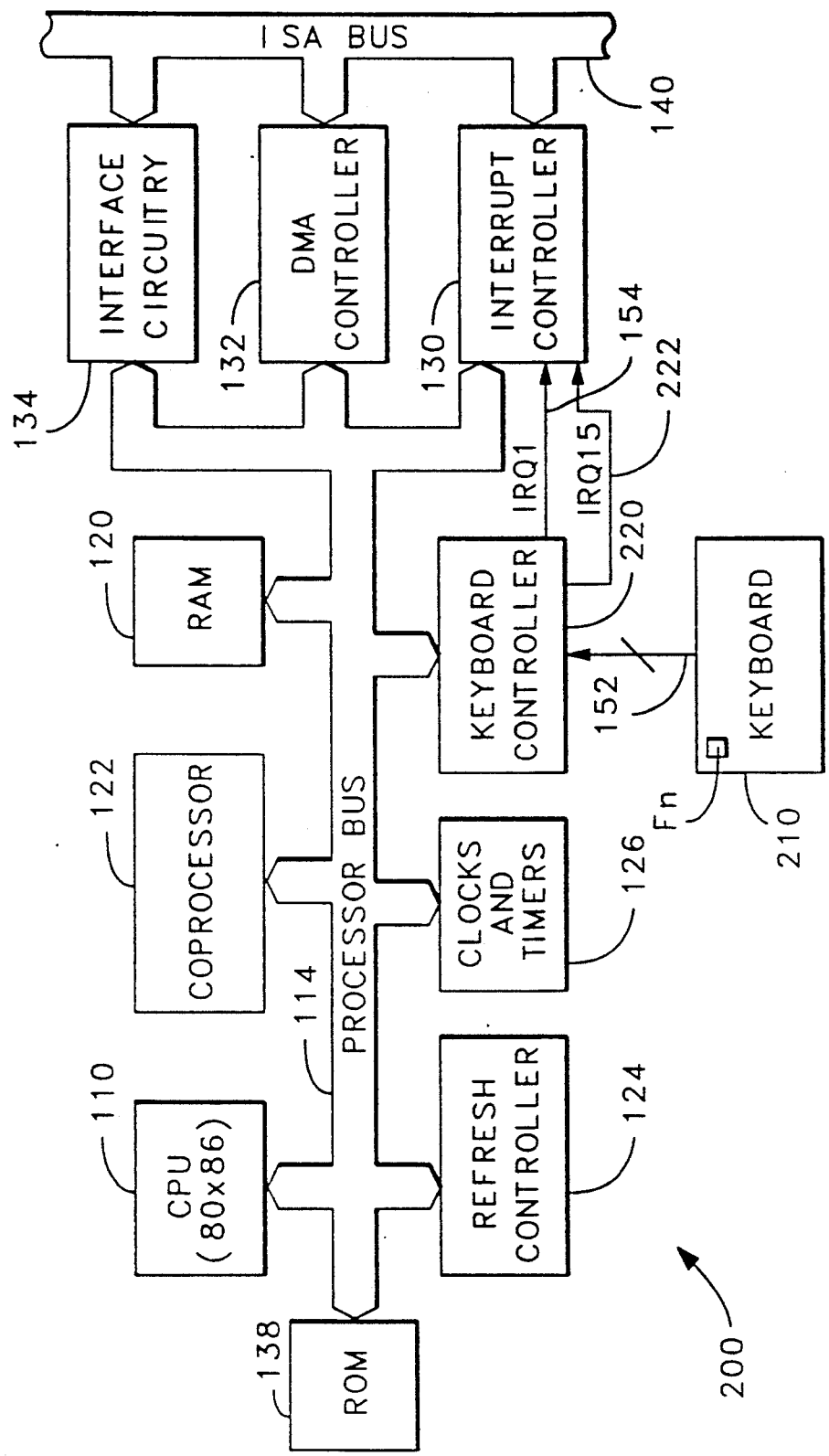
FIG. 4 is a block diagram of a first embodiment of the present invention.
Figure 5:
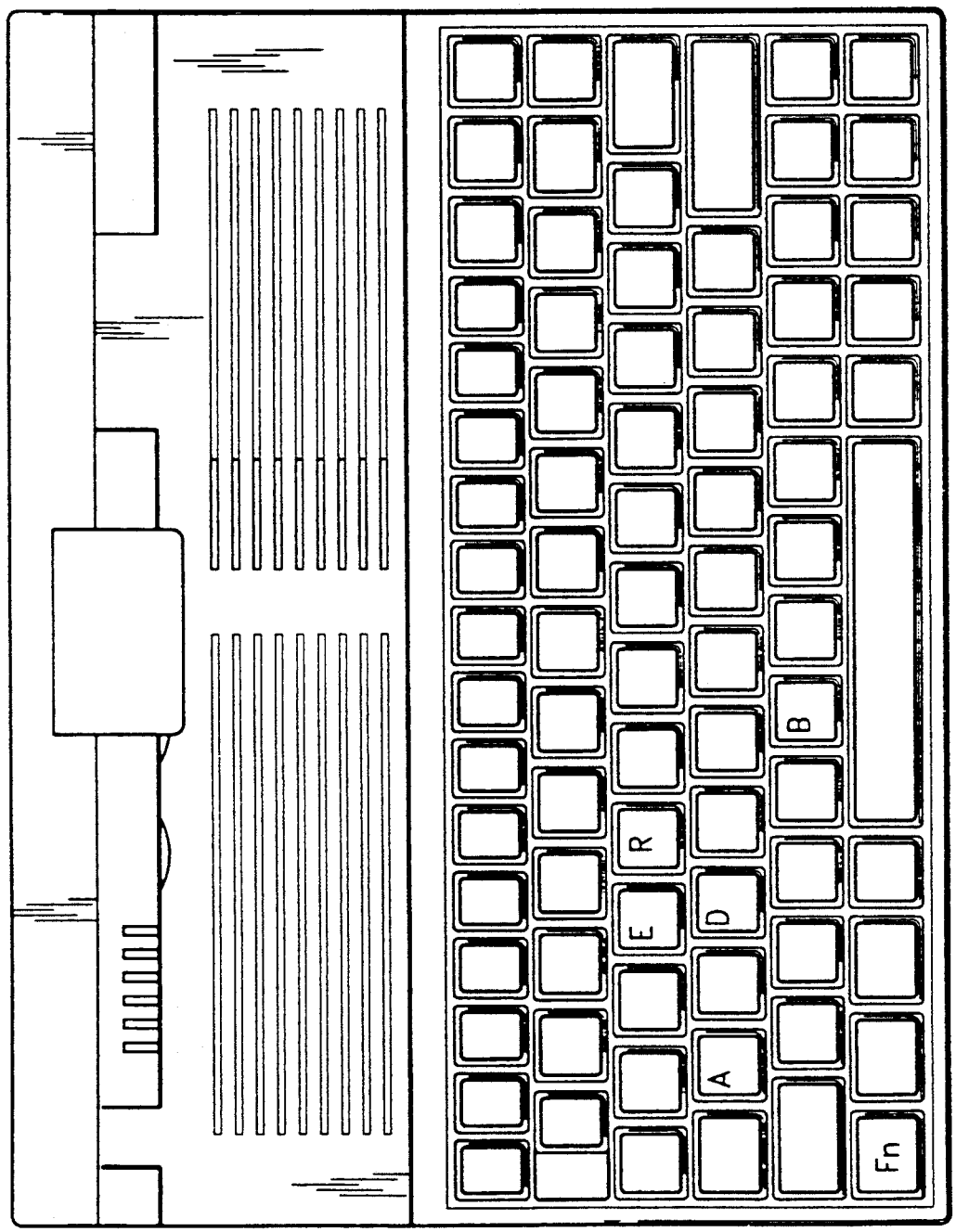
FIG. 5 illustrates a keyboard that includes the extra function key in accordance with the present invention.

The present invention is illustrated in FIG. 4 in connection with a computer system 200 wherein like numbers indicate elements corresponding to the elements of the computer system 100 of FIG. 1. The present invention provides an improved hot key function that cannot be disabled by conventional hot key programs. The improved hot key function is preferably built into a computer system 200 by a manufacturer and is initialized when the computer system 200 is powered up or reset. In a conventional ISA compatible computer system 100 of FIG. 1, the keyboard 150 has twelve function keys identified as F1, F2 . . . F11, and F12. One element of the present invention is the addition of a thirteenth function key Fn on an improved keyboard 210, shown in more detail in FIG. 5. Since the thirteenth function key Fn is not on a conventional keyboard, presently available applications programs and hot key programs will not include provisions for operating on scan codes from the function key Fn.

The computer system 200 illustrated in FIG. 4 is similar to the conventional ISA compatible computer system 100 illustrated in FIG. 1; however, an improved keyboard controller 220 is responsive to scan codes generated by the activation of the thirteenth function key Fn on the keyboard 210 to generate an interrupt request signal IRQ15 on an interrupt request signal line 222 to the interrupt controller 130. The IRQ15 signal line is typically not used on conventional ISA compatible computer systems and is thus available for use with the thirteenth function key Fn.

Figure 6:
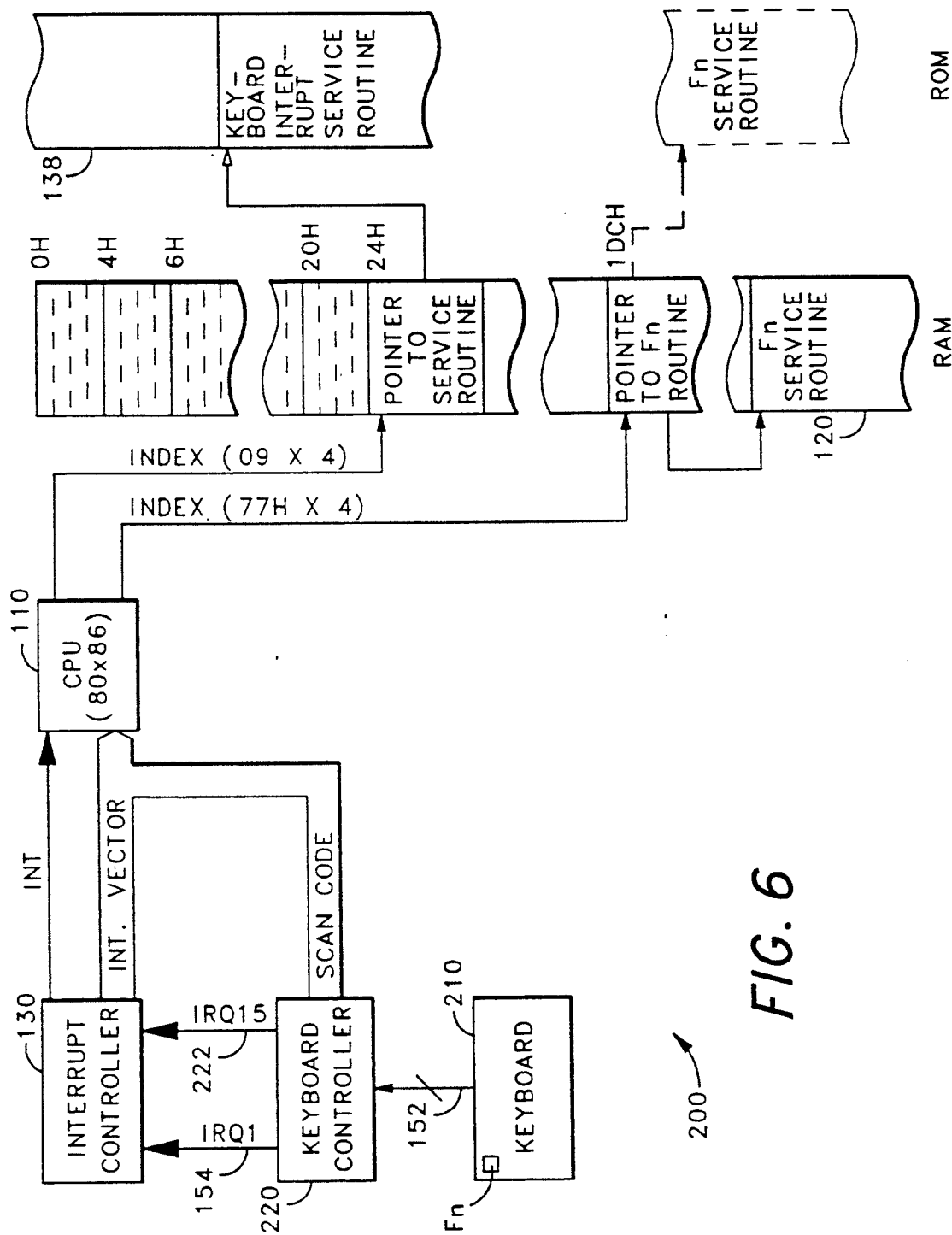
FIG. 6 is a partial block diagram and pictorial illustration similar to FIG. 3 showing the communication of keyboard scan code information from the keyboard controller and further showing the effect of the function key and function key service routine in accordance with the present invention.

FIG. 6 pictorially illustrates the operation of the present invention. FIG. 6 is similar to FIG. 2; however, the IRQ15 signal line 222 is included to signal the interrupt controller 130 that the Fn key on the keyboard 210 has been activated. The interrupt controller 130 responds to the activation of the IRQ15 signal line 222 by interrupting the microprocessor 110 as before. When the microprocessor 110 responds to the interrupt controller 130, the interrupt controller 130 communicates an interrupt vector having a value of 77H to the microprocessor 110 to indicate that IRQ15 is active and has the current highest priority. The microprocessor 110 uses the value of 77H as an index and accesses location 1DCH (i.e., 77H ×4) in the RAM 120 to obtain a pointer to the Fn service routine in the RAM 120. The Fn service routine in the RAM 120 can be loaded during initialization of the computer system 200. Alternatively, the Fn service routine can be provided as part of the BIOS in the ROM 138 as illustrated in dashed lines in FIG. 6.

When the Fn service routine is activated, the keyboard controller 220 is interrogated by the microprocessor 110 to obtain the function desired by the user.

Although the thirteenth function key Fn can be used alone to specify a particular function in a manner similar to the function keys F1 through F12, in the preferred embodiment described herein, the thirteenth function key Fn is activated in conjunction with one of the alphanumeric keys to specify one of a plurality of predetermined functions. For example, the combination of the Fn key and the "A" key can cause the Fn service routine to perform one predetermined function and the combination of the Fn key and the "B" key can cause the Fn service routine to perform a different predetermined function. Thus, the first activity of the Fn service routine is to cause the microprocessor 110 to input the keyboard scan code from the keyboard controller 220 and perform the function associated with the scan code. For example, in the preferred embodiment, the "A", "B", "D", "E" and "R" keys are used in combination with the Fn key to control video modes of the computer system 200.

Since the IRQ15 interrupt signal line 222 is activated rather than the IRQ1 signal line 154, the conventional keyboard service routine is not activated. Thus, the conventional keyboard service routine does not have to be modified to accommodate the thirteenth function key Fn. Furthermore, since the pointer to the Fn service routine is located at address 1DCH in the RAM 120, conventional TSR programs will not affect the operation of the Fn service routine since such programs modify only the pointer at address 24H. Thus, such TSR programs can continue to be used without interference with the Fn service routine.

Figure 7:
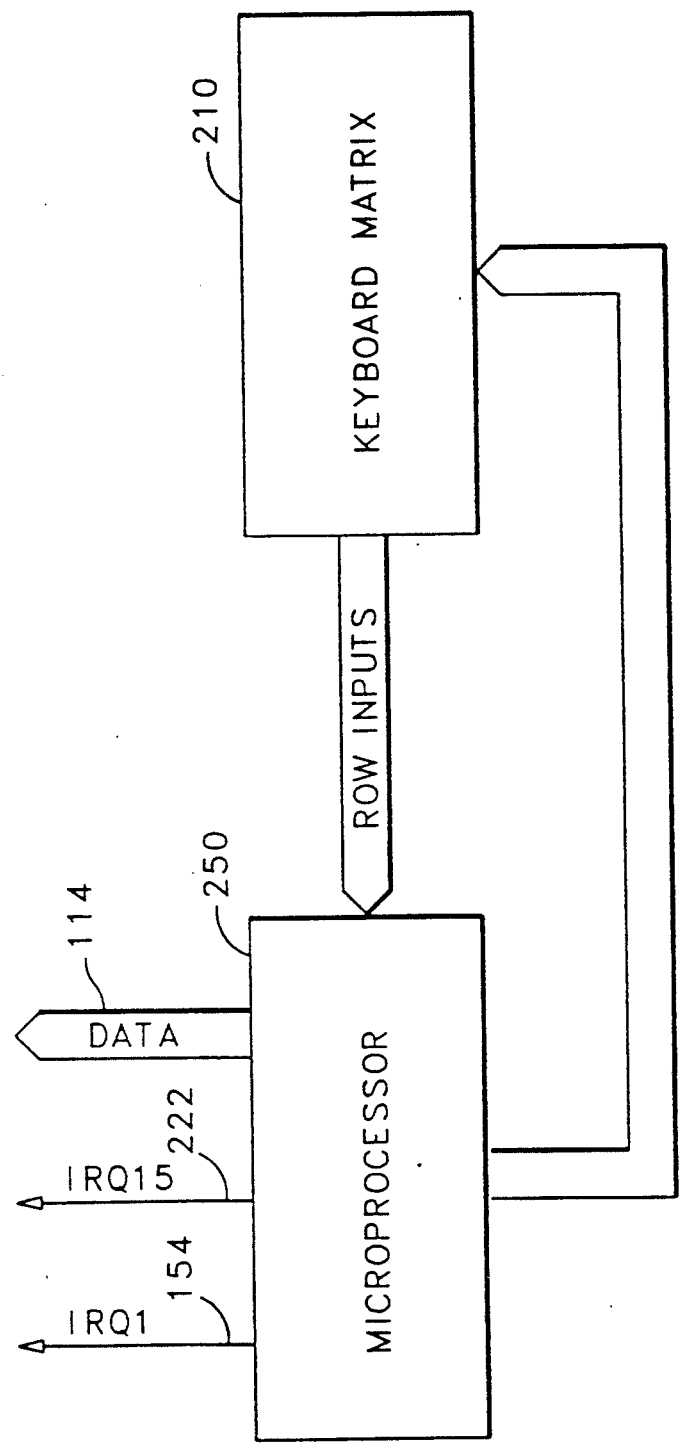
FIG. 7 is a partial block diagram of a keyboard in accordance with the present invention showing the control microprocessor and the keyboard matrix.

As illustrated in FIG. 7, in preferred embodiments of the present invention, the keyboard controller 220 and the keyboard 210 are combined as a single unit such as in a laptop computer system, or the like. The keyboard controller 220 is controlled by an internal keyboard microprocessor 250 that generates column output signals to the keyboard 210 which, as described above, is a matrix of contact switches (not shown) which are electrically arranges in rows and columns. When a switch is activated (i.e., closed) by depressing the respective key on the keyboard 210, the column line (not shown) for that switch is electrically connected to the row line (not shown) for that switch. When a column signal is communicated to a closed switch via its column line, the column signal is communicated to the row line. The keyboard microprocessor 250 can thereby determine whether a switch is closed by sequentially activating the column outputs and reading the row inputs to detect whether one of the row lines is active.

When the keyboard microprocessor 250 detects an active row signal, it uses the row signal and the currently active column signal to uniquely identify which of the keys on the keyboard 210 is depressed. The key is identified with a scan code in a conventional manner. If the key is not the thirteenth function key Fn, the scan codes caused by depressing and releasing the key are stored by the keyboard microprocessor 250. The keyboard microprocessor 250 in the keyboard controller 130 activates the IRQ1 signal line 154, and, when the system microprocessor 110 responds, communicates the scan codes to the system microprocessor 110 via the processor bus 114. The system microprocessor 110 handles the scan codes in a conventional manner.

In contrast to the foregoing, when the keyboard microprocessor 250 detects the activation of the thirteenth function key Fn, it waits for the activation of an alphanumeric key. It then activates the IRQ15 signal line 222 rather than the IRQ1 signal line 154. When the system microprocessor 110 responds to the interrupt, the scan code for the alphanumeric key is communicated to the system microprocessor 110. Since the system microprocessor 110 is executing the Fn service routine in response to the IRQ15 signal, the system microprocessor 110 performs an Fn service routine associated with the alphanumeric key.

Figure 8:
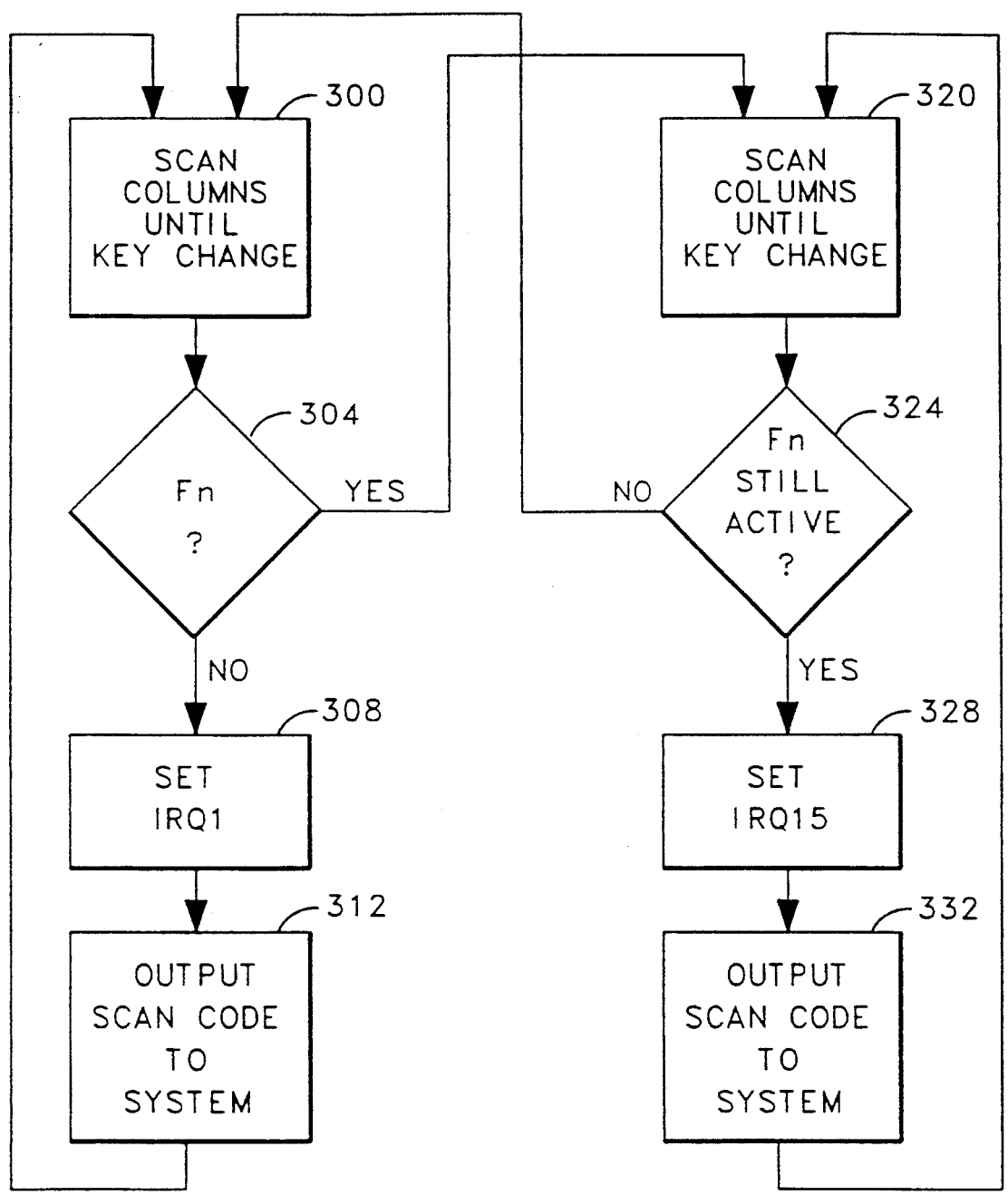
FIG. 8 is a flow chart illustrating the operation of the microprocessor in the keyboard controller of the present invention.

The foregoing is summarized in a flow diagram in FIG. 8. In an activity block 300, the keyboard microprocessor 250 scans the columns until it detects a key change as indicated by an inactive row becoming active or an active row becoming inactive. In a decision block 304, the row and column of the changed key are checked to determine whether the Fn function key has been activated. If not, the keyboard microprocessor 250 executes an activity block 308 wherein it sets (i.e., activates) the IRQ1 signal line, and, when the system microprocessor 110 responds, communicates the scan code to the system microprocessor 100 as indicated in an activity block 312. The system microprocessor 110 utilizes the scan code in a conventional manner.

Returning to the decision block 304, if the Fn function key is active, the keyboard microprocessor 350 again scans the columns until a key change occurs as indicated in an activity block 320. (The activity block 320 can of course utilize a scanning subroutine in common with the activity block 300.) When a key change is detected, the keyboard microprocessor 250 first determines whether the Fn function key is still active in a decision block 324. If not, the user has not activated an alphanumeric key while the Fn function key is active or has completed the Fn functions, and the keyboard microprocessor 250 returns to the activity block 300. If the Fn function key is still active, the keyboard microprocessor 250 activates the IRQ15 signal in an activity block 328, and, when the system microprocessor 110 responds, the keyboard microprocessor 250 outputs the scan code for the alphanumeric key to the system microprocessor 110 in an activity block 332. The system microprocessor 110 then performs the Fn function associated with the activated alphanumeric key. The keyboard microprocessor continues to scan the columns and activate the IRQ15 signal until the Fn function key becomes inactive.

Figure 9:
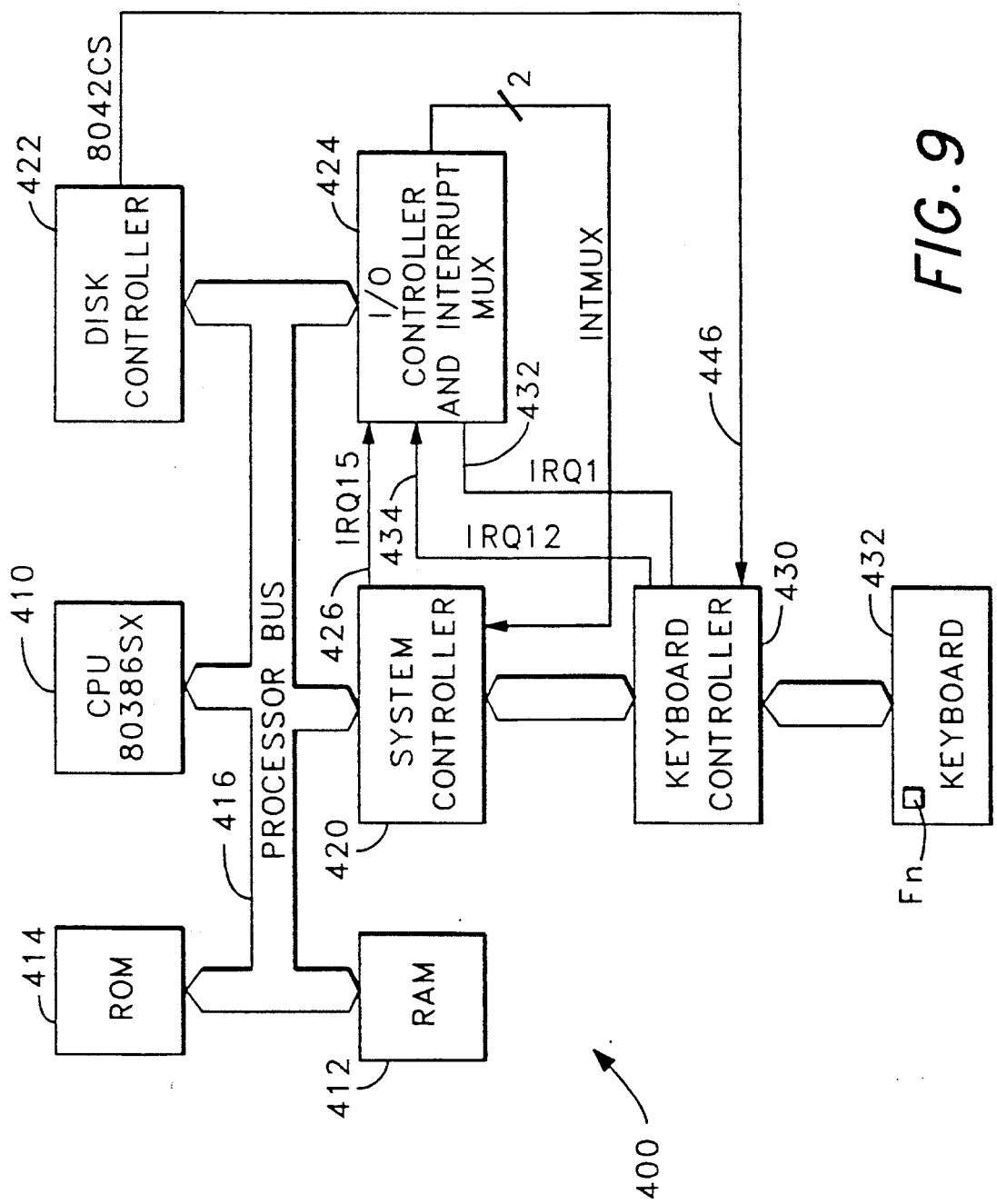
FIG. 9 is a block diagram of an alternative embodiment of the present invention which utilizes an integrated circuit system controller as an interface between the keyboard controller and the microprocessor.

FIG. 9 illustrates an alternative embodiment of the present invention when implemented in a computer system 400 that utilizes the Intel 80386SX microprocessor 410 having a RAM 412 and a ROM 414 connected to a processor bus 416. A coprocessor (not shown) may also be included, as before. The system of FIG. 9 includes a commercially available computer system chip set available from Western Digital Corporation of Irvine, Calif. Such a chip set comprises a WD76C10 system controller integrated circuit 420, a WD76C20 hard disk drive and floppy disk drive controller integrated circuit (DISK CONTROLLER) 422, and a WD76C30 peripheral controller and interrupt multiplexer integrated circuit (I/O CONTROLLER AND INTERRUPT MUX) 424. In this embodiment, the IRQ15 signal is provided as an output of the system controller on a line 426 and is connected as an input to the I/O controller and interrupt multiplexer 424.

A keyboard controller 430 is connected to the system controller 420 and the I/O controller and interrupt multiplexer 424. A keyboard 432 is connected to the keyboard controller 430. The keyboard controller 430 provides an IRQ1 output signal on a line 432 and an IRQ12 output signal on a line 434.

Briefly, the three Western Digital integrated circuits 420, 422, 424 combine a number of functions previously implemented in a plurality of smaller integrated circuits to communicate with an Intel 80386SX microprocessor 410. In particular, with respect to present invention, the system controller integrated circuit 420 controls communication between the keyboard controller 430 and the microprocessor 410. Further, the I/O controller and interrupt multiplexer 424 multiplexes the IRQ15 output signal from the system controller 420 and interrupts from other sources (e.g., the keyboard controller 430) and provides a multiplexed interrupt signal to the system controller 420 on a pair of INTMUX signal lines 436. The system controller 420 includes an internal interrupt controller (not shown) that responds to interrupts by interrupting the microprocessor 410 and transferring interrupt vectors to the microprocessor 410 as was discussed above for the interrupt controller 130 in FIG. 4.

The operation of the system controller 420 is fully described in WD75C10, WD76C10, WD76C10LP System Controller for 803868X, 80286, Desktop and Portable Compatibles, an advanced information data sheet published by Western Digital Corporation on Sep. 21, 1990. Rather than communicating directly with the microprocessor 410, the keyboard controller 430 communicates through the system controller 420. This is illustrated in more detail in FIG. 10. As illustrated, the keyboard controller communicates to the system controller 420 via an eight-bit data bus 440 comprising data signals RAD0 through RAD7. The system controller 420 controls the direction of transfer of data between the system controller 420 and the keyboard controller 430 via an XIOR (I/O read) line 442 and an XIOW (I/O write) line 444. The keyboard controller 430 is responsive to the signals on the XIOR line 442 and the XIOW line 444 when an 8042CS signal on a line 446 is active to indicate a command to the keyboard controller 430. The 8042CS signal on the line 446 is generated by the disk controller 422 (FIG. 9) when the disk controller 422 decodes an I/O address corresponding to the address of the keyboard controller 430.

Asynchronous communication between the system controller 420 and the keyboard controller 430 is provided by a first eight-bit register 450 and a second eight-bit register 452 which have their respective inputs connected to the eight-bit data bus 440. The data on the eight-bit data bus 440 is transferred to the first register 450 when a write signal (W0) on a signal line 460 becomes active. The W0 write signal is generated by an AND-gate 462 when the system controller 430 activates its PCUW0 signal on a line 464 connected to a first input to the AND-gate 462 and the XIOW signal on the line 444 is active on a second input to the AND-gate 462. Similarly, the data on the bus 440 is transferred to the second register 452 when a write signal (W1) on a signal line 470 becomes active. The W1 write signal is generated by an AND-gate 472 when the system controller 430 activates its PCUW1 signal on a line 474 connected to a first input to the AND-gate 472 and the XIOW signal on the line 444 is active on a second input to the AND-gate 472.

Of the eight outputs of the first register 450, one output pertains to the present invention. A signal on output bit 3 of the first register 450 is a local request acknowledge (LCLACK) signal that is provided on a signal line 480. As discussed below, the LCLACK signal is used by the system controller 430 as a handshake signal with the keyboard controller 420.

Of the eight outputs of the second register 452, one output pertains to the present invention. A signal on output bit 2 of the second register 452 is a set interrupt (SETINT) signal that is provided on a signal line 482. As discussed below, the SETINT signal is used to cause the system controller 420 to generate the IRQ15 signal.

An eight-to-one multiplexer (8:1 MUX) 490 is also provided to initiate communications from the keyboard controller 420 to the system controller 430. The 8:1 MUX 490 has eight inputs, one of which is connected to the SETINT signal on the signal line 482 and the other of which is connected to a local request (LCLREQ) signal on a signal line 492 which is connected to an output of the keyboard controller 430. The 8:1 MUX 490 is controlled by three multiplexer control lines MXCTL0, MXCTL1 and MXCTL2 (labeled as 494, 495, 496, respectively). The output of the 8:1 MUX 490 is a signal PCUIN on signal line 498 which is connected to the PCUIN input of the system controller 420. The system controller 420 continuously polls the inputs to the 8:1 MUX 490 by applying a sequential 3-bit binary signal to the three multiplexer lines 494–496. When the three multiplexer control lines have a binary value of 010, for example, the LCLREQ signal is communicated to the system controller 420, and when the three multiplexer control lines have a binary value of 111, for example, the SETINT signal is communicated to the system controller 420. The system controller 420 advantageously utilizes this polling method so that eight signals can be communicated to the system controller 420 from external devices using only the single PCUIN signal line 498. Additional multiplexers (not shown) can also be controlled by the same multiplexer control signals to multiplex other input signals to the system controller 430.

The keyboard controller 430 communicates to the system controller 420 utilizing a communications protocol defined for the Western Digital system controller 420. Briefly, the keyboard controller 430 initiates communication by activating the LCLREQ signal on the signal line 492 as indicated at 500 in the timing diagrams of FIG. 11. As discussed above, the system controller 430 polls the 8:1 MUX 490, and when the LCLREQ signal is active, the system controller 420 responds by outputting a value on the bus 440 and activating the PCUW0 signal and the XIOW signal to generate an active W0 signal on the line 460. The output value includes a logical one in the bit 3 position to activate the LCLACK signal on the line 480, as indicated at 502 in FIG. 11, to indicate to the keyboard controller 430 that the request has been acknowledged and that the keyboard controller should send data to the system controller 430. The system controller 430 activates the LCLACK signal only after it has requested the microprocessor 410 (FIG. 9) to hold by activating the conventional HOLD signal, as indicated at 504 in FIG. 11, and has received an active hold acknowledge (HLDA) signal from the microprocessor 410, as indicated at 506 in FIG. 11. The HOLD and HLDA signals are well-known signals and are not shown in the block diagram in FIG. 9.

Figure 11:
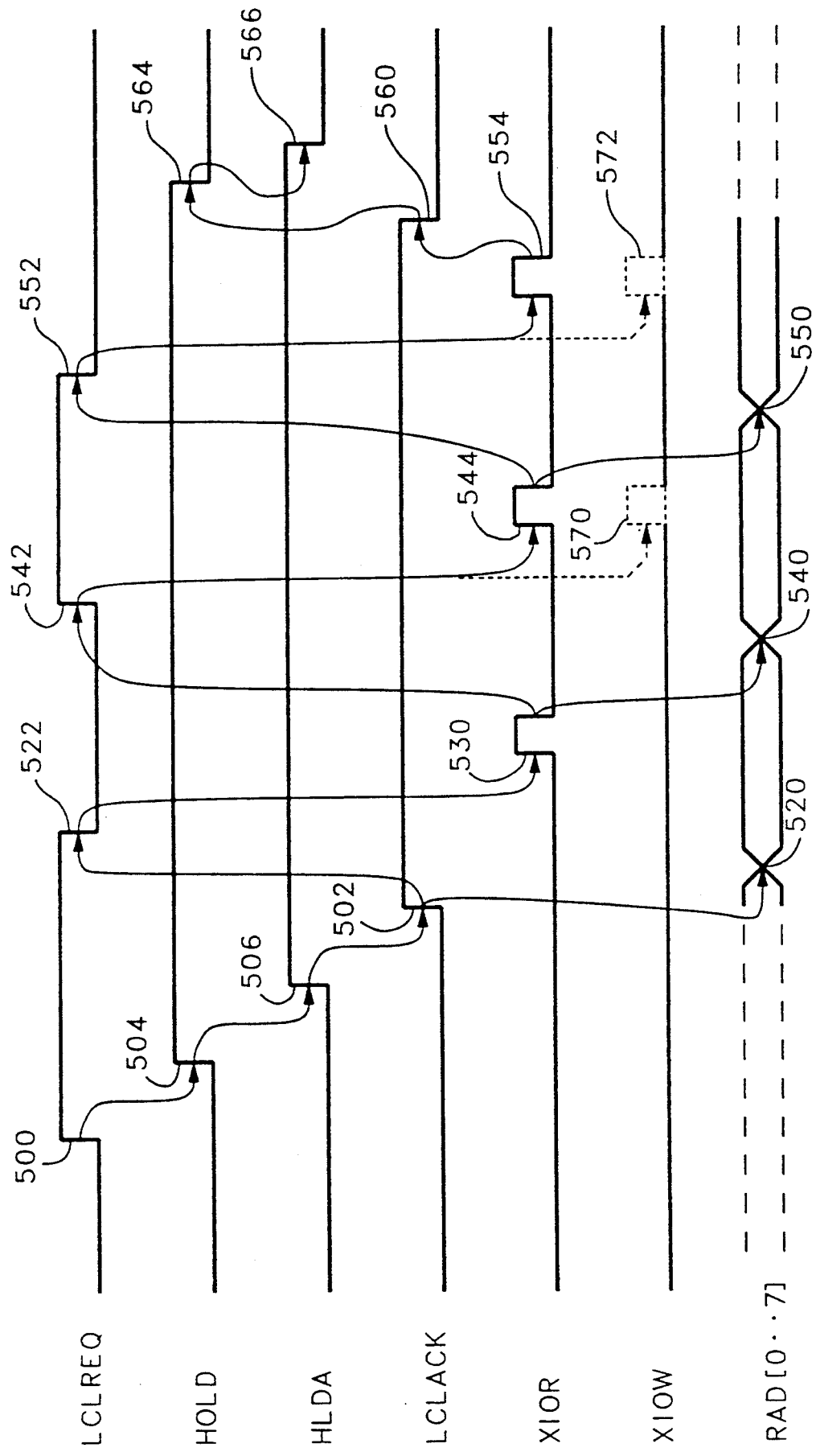
FIG. 11 illustrates timing diagrams of the communication between the system controller and the keyboard controller of FIG. 10.

As further illustrated in FIG. 11, when the keyboard controller 420 receives the active LCLACK signal, it has control of the bus 440, and it places data on the bus 440, as indicated at 520 in FIG. 11, to indicate whether it wants to send subsequent data to the system controller 430 or to receive subsequent data from the system controller and to further indicate the type of data to be sent or received. The most significant bit of the bus (bit 7) is the direction bit, with a one in bit 7 indicating that the subsequent data is to be transferred from the system controller 420 to the keyboard controller 430 and a zero in bit 7 indicating the transfer of data from the keyboard controller 430 to the system controller 430. The next six most significant bits (bits 6, 5, 4, 3, 2 and 1) define an operation code (OPCODE) that determines the type of operation to be performed by the system controller 430. For example, with respect to the present invention applying an opcode of 110000 to bits 6-1 of the bus 440 with the direction bit set to a zero causes the system controller 420 to read two bytes of data from the keyboard controller 430 and store the data in an internal register (referred to herein as the bulletin board register) that can be accessed by the microprocessor 410 on I/O address C072 using conventional I/O read operations. After placing the data on the bus 440, the keyboard controller 430 deactivates the LCLREQ signal, as indicated at 522 to indicate that the direction and opcode data is available to the system controller 420.

Continuing to refer to FIG. 11 and continuing to discuss the transfer of data to the bulletin board register, when the system controller 420 has received the data on the bus 440, it activates the XIOR signal on the line 442, as shown at 530, to indicate to the keyboard controller 430 that the data has been received. The keyboard controller 430 responds by changing the data on the data bus 440 to the most significant byte of data to be stored in the bulletin board register, as indicated at 540, and thereafter deactivating the LCLREQ signal, as indicated at 542, to indicate to the system controller 420 that the data is ready. The system controller 420 responds by transferring the data on the bus 440 to the most significant byte of the bulletin board register and activating the XIOR signal, as indicated at 544, to indicate that the data has been transferred. Thereafter, the keyboard controller 430 changes the data on the bus 440 to the least significant byte of data, as indicated at 550, and again activates the LCLREQ signal to indicate to the system controller 430 that the data is ready, as indicated at 552. The system controller 420 transfers the data to the least significant byte of the bulletin board register and activates the XIOR signal, as indicated at 554, to indicate that the data has been transferred. Thereafter, the keyboard controller 430 deactivates the LCLREQ signal, as indicated at 560, and the system controller 420 deactivates the LCLACK signal, as indicated at 562, and deactivates the HOLD signal, as indicated at 564, so that the microprocessor 410 can deactivate the HLDA signal, as indicated at 566, and resume operation.

Continuing to refer to FIG. 11, if the system controller 420 is to transfer data to the keyboard controller 430, when the keyboard controller 430 first deactivates the LCLREQ signal at 522, the system controller 420 places the most significant byte of data on the bus 440 at 540 and after the data has had sufficient time to stabilize activates the XIOW signal line, as indicated in dashed lines at 570, to cause the keyboard controller 430 to transfer the data from the bus 440. Thereafter, the keyboard controller 430 activates the LCLREQ signal at 542 to indicate that it has transferred the first byte of data. The system controller 420 then changes the data on the bus 440 to the least significant byte of data, as indicated at 550, and activates the XIOW signal line, as indicated in dashed lines at 572, to cause the keyboard controller 430 to transfer the least significant byte of data from the bus 440. The keyboard controller 430 acknowledges acceptance of the least significant byte by deactivating the LCLREQ signal at 552, and the remainder of the handshaking concludes as described above.

The just described procedure is used by the keyboard controller 430 to transfer conventional keyboard scan codes to the microprocessor 410. It first transfers the scan code to the bulletin board register in the system controller 420, as described above. It then activates the IRQ1 interrupt line to the I/O controller and interrupt multiplexer 424 (FIG. 9) which interrupts the microprocessor 410 and causes it to execute the conventional keyboard handling routine, as discussed above. The microprocessor 410 reads the bulletin board register in the system controller 420 and receives the scan code stored therein.

If the Fn function key and an alphanumeric key are activated, the operation of the keyboard controller 430 and the system controller 420 is different. After the keyboard controller 430 determines that the Fn function key is active and after it determines the scan code of the alphanumeric key that has been pressed along with the Fn function key, the keyboard controller 430 transfers the scan code of the alphanumeric key to the bulletin board register, as described above. Thereafter, instead of activating IRQ1, the keyboard controller 430 utilizes the system controller 430 to indirectly generate the IRQ15 signal.

Figure 10:
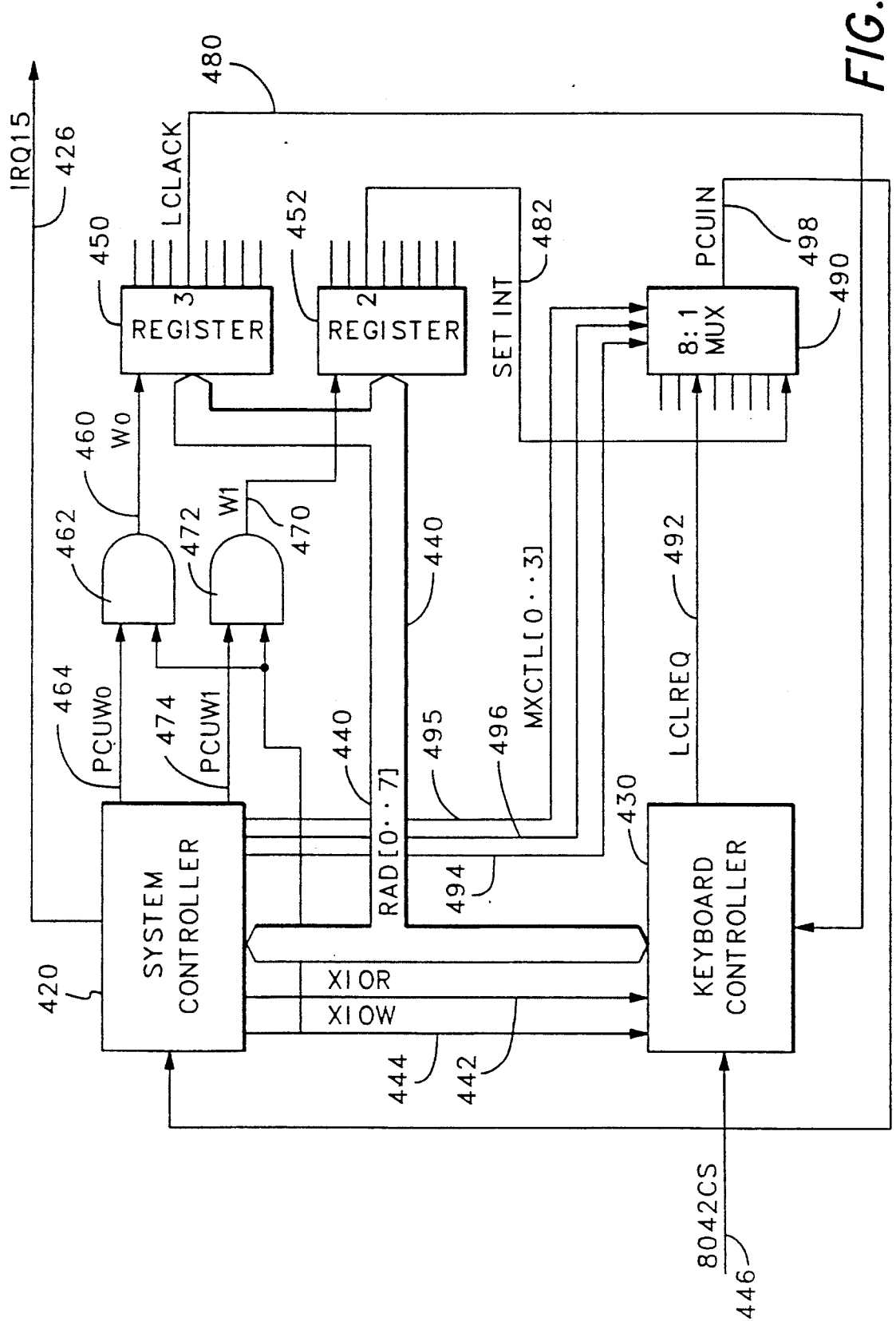
FIG. 10 is a partial block diagram of the alternative embodiment of FIG. 9 showing additional detail of the interconnection between the system controller and the keyboard controller.

In order to generate the IRQ15 signal, the keyboard controller 430 initiates a data transfer to the keyboard controller 430 from the system controller 420 by applying data to the bus 440 with the direction bit set to a one. The opcode portion of the data on the bus 440 is set to 001111 to cause the system controller 420 to transfer the contents of register location 7872 to the keyboard controller 430. The keyboard controller 430 sets bit 2 in the data received from the system controller 420 and transfers the data back to the system controller 420 to be stored in register location 7872. The new data in register location 7872 is identical to the old data except that bit 2 is now set. The system controller activates the XIOW signal with the PCMW1 signal active to transfer the data from the register location 7872 to the second register 452 (FIG. 10). This is a built in function of the system controller 420 available from Western Digital Corporation. Since bit 2 of the data transferred to the second register 452 is set, the SETINT signal on the line 482 becomes active, and, when the 8:1 MUX 490 is polled by the multiplexer control lines 494-496, the PCUIN signal on the line 498 becomes active when the multiplexer control lines 494-496 have a binary value of 010.

After transmitting the data to the register location 7872, the keyboard controller 430 again reads the register location 7872 and clears bit 2 in the received data. It then transmits the modified data back to the system controller 420 which in turn outputs the data to the second register 452 to thereby deactivate the SETINT signal on the line 482.

The system controller 420 is configured to map the PCUIN line to a non-maskable interrupt (NMI) output when the multiplexer control lines 494-496 have a binary value of 010. Rather than communicating the NMI output to the microprocessor 410, in the present invention, the NMI output of the system controller is connected to the IRQ15 signal line 426 and is thus provided as the IRQ15 input of the I/O controller and interrupt multiplexer 424. When the SETINT signal on the line 482 is activated and then deactivated, the IRQ15 signal on the line 426 is likewise activated and deactivated. The I/O controller and interrupt multiplexer 424 communicates the active interrupt back to the system controller via the INTMUX signal lines 436. The system controller 420 responds to the multiplexed interrupt, interrupts the microprocessor 410 and transfers the vector corresponding to IRQ15 to the microprocessor 410, as discussed above for the previous embodiment. The microprocessor 410 executes the interrupt service routine dedicated to handling IRQ15, reads the scan code data stored in the system controller 420 and executes the function associated with the scan code. Thus, as discussed above with respect to the first embodiment, the handling of the IRQ15 function is entirely independent of the conventional keyboard handling via IRQ1 and cannot be compromised by conventional TSR programs or the like.

The indirect generation of the IRQ15 signal described above enables the present embodiment of the invention to utilize existing I/O pins on the Western Digital integrated circuits and reduces the number of pins required on the keyboard controller.

Although described above in connection with the two preferred embodiments, one skilled in the art will appreciate that the present invention can be implemented in other embodiments while remaining within the scope of the present invention as defined in the appended claims.

What is claimed is:

1. A system for providing a built-in function in an ISA-compatible computer in response to activation of a selected combination of user activated keys, comprising:

a keyboard having a set of conventional alphanumeric and function keys and further having at least one additional function key;

a keyboard controller connected to said keyboard to monitor said conventional keys and said additional function key to detect when at least one of said keys is activated, said keyboard controller having first and second interrupt signal lines connected to said ISA-compatible computer, said keyboard controller responsive to an activation of at least one of said conventional keys to activate a first interrupt signal to said ISA-compatible computer on said first interrupt signal line, said keyboard controller responsive to an activation of said additional function key in combination with at least one of said conventional alphanumeric keys to generate a second interrupt signal to said ISA-compatible computer on said second interrupt signal line;

a first conventional interrupt handling routine within said ISA-compatible computer responsive to said first interrupt signal from said keyboard controller to input data scan codes from said keyboard; and a second non-conventional interrupt handling routine within said ISA-compatible computer responsive to said second interrupt signal from said keyboard controller to input an identification of said activated alphanumeric key and to perform a predetermined function selected by said identified alphanumeric key.

2. The system for providing a built-in function as defined in claim 1, wherein said second non-conventional interrupt handling routine resides in random access memory.

3. The system for providing a built-in function as defined in claim 1, wherein said second non-conventional interrupt handling routine resides in read only memory.

4. The system for providing a built-in function as defined in claim 1, further comprising a central processing unit that indexes a first memory location pointer in response to said first interrupt signal, said central processing unit further indexing a second memory location pointer in response to said second interrupt signal.

5. A system for servicing keyboard interrupts in an ISA-compatible computer, comprising:

a keyboard having a plurality of keys including conventional alphanumeric keys, conventional symbol keys, conventional function keys and conventional cursor control keys, said keyboard further including at least one non-conventional function key, said keyboard generating a scan code in response to an activation of at least one of said keys, said scan code varying depending upon which of said keys is activated; and a keyboard controller coupled to said keyboard, said keyboard controller further coupled to said ISA-compatible computer by first and second interrupt signal lines, said keyboard controller generating a first interrupt signal on said first interrupt signal line upon receipt of a scan code corresponding to one of said conventional keys, said ISA-compatible computer programmed to execute a program to input said scan code in response to said first interrupt signal, said keyboard controller generating a second interrupt signal on said second interrupt signal line upon receipt of a scan code corresponding to said non-conventional function key, said ISA-compatible computer programmed to execute at least one special routine upon receipt of said second interrupt signal.

6. The system for servicing keyboard interrupts as defined in claim 5, further comprising an interrupt controller coupled to said keyboard controller, said interrupt controller generating one of a plurality of interrupt vectors, said vector depending upon said interrupt signal.

7. The system for servicing keyboard interrupts as defined in claim 6, further comprising a Central Processing Unit coupled to said interrupt controller, said Central Processing Unit indexing one of a plurality of memory locations, said memory location depending upon said interrupt vector.

* * * * *